United States Patent [19]

Hagin

[11] 4,313,351

[45] Feb. 2, 1982

[54] MULTIPLE-POWER GEAR DRIVE TRANSMISSION AND DRIVE ASSEMBLY INCLUDING SUCH TRANSMISSION, AND BRAKE ENERGY ACCUMULATOR

[75] Inventor: Faust Hagin, Munich, Fed. Rep. of Germany

[73] Assignee: Maschinenfabrik Augsburg-Nurnberg Aktiengesellschaft, Fed. Rep. of Germany

[21] Appl. No.: 18,357

[22] Filed: Mar. 6, 1979

[30] Foreign Application Priority Data

Mar. 8, 1978 [DE] Fed. Rep. of Germany ....... 2810086

[51] Int. Cl.³ ...................... F16H 47/04; F16H 37/06
[52] U.S. Cl. .................................... 74/687; 74/720.5; 74/740; 180/165
[58] Field of Search ...................... 74/687, 720.5, 740; 180/165

[56] References Cited

U.S. PATENT DOCUMENTS

| 3,903,756 | 9/1975 | Hamma | 74/687 |
| 3,969,958 | 7/1976 | Miyao et al. | 74/687 |
| 4,098,144 | 7/1978 | Besel et al. | 74/687 |

FOREIGN PATENT DOCUMENTS

| 2541975 | 3/1977 | Fed. Rep. of Germany | 74/687 |
| 2637322 | 2/1978 | Fed. Rep. of Germany | 180/165 |
| 2655011 | 6/1978 | Fed. Rep. of Germany | 74/687 |
| 2716960 | 10/1978 | Fed. Rep. of Germany | 74/687 |
| 2002862 | 2/1979 | United Kingdom | 74/687 |
| 298495 | 3/1971 | U.S.S.R. | 74/687 |

*Primary Examiner*—James Kee Chi
*Attorney, Agent, or Firm*—Scully, Scott, Murphy & Presser

[57] ABSTRACT

A multiple-power gear drive transmission comprising a planetary differential gear drive including a plurality of drive elements such as sun gear, web gear and internal gear. A gear drive input shaft is connected with at least one of the drive elements; a gear drive output shaft is connected with another of the drive elements; a first positive-displacement machine operable in both directions as pump or motor is coupled to a third of the drive elements for controlling the direction of rotation and speed of rotation thereof; and a second positive-displacement machine operable as a pump or motor is energy-transmissively coupled with the first positive-displacement machine. The planetary differential gear drive includes two of the sun gears which have different diameters; on web gear being arranged dual planetary gears, the gears thereof meshing with the sun gears and with an internal gear wherein the larger sun gear is connected with the gear drive input shaft. Shift couplings selectively connect the second positive-displacement machine in dependence upon the speed of rotation of the gear drive output shaft with either the gear drive output shaft or with the smaller sun gear.

19 Claims, 7 Drawing Figures

MULTIPLE-POWER GEAR DRIVE TRANSMISSION AND DRIVE ASSEMBLY INCLUDING SUCH TRANSMISSION, AND BRAKE ENERGY ACCUMULATOR

BACKGROUND OF THE INVENTION

1. Field of the Invention

The present invention relates to a multiple-power gear drive or transmission including a planetary differential gear drive which encompasses a plurality of gear drive elements such as sun gear, web gear and internal gear whereby a gear drive input shaft is coupled with at least one of these gear drive elements, and a gear output drive shaft with another of these elements. For the control of the direction of rotation and the rotational speed of a third gear drive element, coupled thereto is a positive-displacement machine which is operable in both directions as either a pump or motor, or an electromotor (control power machine) operable in four-quadrant operation, and including a second positive-displacement machine operable as either a pump or motor, or alternatively a second electromotor operable in four-quadrant operation which is energy-transmissively coupled with the control power machine (torque power engine).

2. Discussion of the Prior Art

Multiple-power gear drives of this basic constructional type are known, for example, from the journal "VDI-Richtlinien" (2152), March 1975, FIGS. 3.8.3. and 3.8.4. In these known gear drive representations, the torque power engine, pursuant to its type of construction, is constantly connected with either the gear input drive shaft or the gear output drive shaft. In these gear drives, dependent upon the ratio between the rotational speeds of the gear drive input and gear drive output, a part of the power is transmitted purely mechanically, whereas another part of the power is transmitted through the energy-transmissive coupling of the above-mentioned power machines.

In the construction with constant coupling of the torque power engine to the drive input shaft, in a first operative range of the gear drive in which $n_{output} : n_{input} > 0.5$, a part of the power circulates in a negative direction (idle power) from the control power machine to the torque power engine which is connected to the gear drive input shaft. In the other type of construction with the constant connection of the torque power engine to the gear drive output shaft, there takes place a reactive or idle power circulation from the torque power engine to the power control machine with a second operative range, namely, in which $n_{output} : n_{input} > 0.5$. These idle power losses adversely influence the efficiency of these known multiple-power gear drives or transmissions.

From German Published Patent Specification No. 15 50 941 there has become known a multiple-power gear drive with two operating ranges and, namely, a first purely hydrostatic range for lower speeds, and a range with power take-off or branching in which the torque power engine is connected with the gear drive input shaft. A shifting from the first operating range to the second operating range takes place in this gear drive at synchronous rotational speeds, however, inasmuch as the hydro-units employed therein are under full load, the reversal in the suction and pressure sides produces strong switching impulses (oil compression) at the instant of the shifting. In addition thereto, the still appreciable component of the hydrostatic power or energy imparts a high noise level to the gear drive.

SUMMARY OF THE INVENTION

Accordingly, it is an object of the present invention to provide a multiple-power gear drive of the above-mentioned type in which there will be encountered only a minimal or no negative (idle) power, in which the component of the hydrostatic power is at a minimum relative to the total transmitted power, which produces a smooth transition from one operating range to the next one, and in which only a minimum number of shifting steps are required for an accelerating sequence from a zero rotational speed to the maximum rotational speed or, conversely, a braking sequence from the maximum rotational speed to zero rotational speed.

In addition thereto, avoided should be an interruption in the flow of power during these shifting procedures. Finally, in order to facilitate a start which is low in loss during constant rotational speed, there is provided a mechanical connecting drive.

Inventively these objects are achieved in that the multiple-power gear drive pursuant to the invention possesses a type of construction incorporating the characteristics set forth hereinbelow and as claimed in claim 1.

Through the intermediary of this inventive construction there can be achieved advantageous degrees of efficiency over the entire operating range, the set problems can be solved and, moreover, it is possible that these problems can be solved through a comparatively less complex construction, in particular a construction which is space and weight saving. With respect to the utilization of such a drive in a vehicle, of particular advantage is the specially short constructional length of the gear drive between the connecting flange on the engine and the drive take-off or output flange.

Further advantageous features of the inventive gear drive can be ascertained from claims 2 through 8, as well as the following detailed description of an exemplary embodiment thereof, taken in conjunction with the accompanying drawings.

In other aspects, the invention relates to a drive assembly for power machines operating in an intermittent manner, especially to vehicles with at least one driving engine, a brake energy storage or accumulator arrangement, and a multiple-power gear drive through which the output shaft of the drive assembly is coupled with the brake energy storage arrangement and the driving engine.

A drive assembly of this type, for example, has already been proposed in German patent application No. P 26 41 886.0. The disadvantage of the drive assembly proposed therein consists of in that the component of the hydrostatic power is relatively large compared to the total transmitted power so as to provide therefrom unsatisfactory degrees of efficiency and a higher noise level.

A further drive assembly group of this constructional type has become known from German Laid-Open Patent Specification No. 25 15 048. Although this construction promises an improved efficiency and a reduced development of noise inasmuch as the hydrostatic energy or power is only converted by a hydro-unit, there is produced a satisfactory operating relationship, however, essentially only during the accelerating and the braking phases for a vehicle.

Accordingly, it is a further object of the present invention to so construct a drive assembly of the above-mentioned type which will produce higher degrees of efficiency than known installations, wherein the development of noise is held to a minimum, and in which the installation operates in a smooth transitional manner. Finally, a drive assembly of this type is subjected to a demand for a space and weight saving construction.

Inventively, the foregoing object is attained in that in a drive assembly evidencing that type of construction, there is employed a new type of multi-power gear drive or transmission of the above-described type. Hereby, the brake energy storage arrangement should preferably incorporate a flywheel and two hydro-accumulators, wherein a high-pressure accumulator is connected to both power or energy machines as to supply them with driving energy during an accelerating phase of the vehicle.

This inventive construction affords the capability that for the storage of the recoverable brake energy, there can be utilized the flywheel as well as also the hydro-accumulators whereby there is obtained a significant reduction in the hydrostatically-converted energy with an advantageous effect on the efficiency and on the noise level of the arrangement. The additional weight of the hydro-accumulator is at least partially compensated for through the reduction in the weight of the flywheel.

Further advantageous features of this inventive drive assembly are set forth hereinbelow and elucidated in claims 11 through 15.

BRIEF DESCRIPTION OF THE DRAWINGS

Reference may now be had to the following detailed description of exemplary embodiments of an inventive multiple-power gear drive and an inventive drive assembly including such a multiple-power gear drive or transmission; wherein in the accompanying drawings.

DETAILED DESCRIPTION

Figure 1:
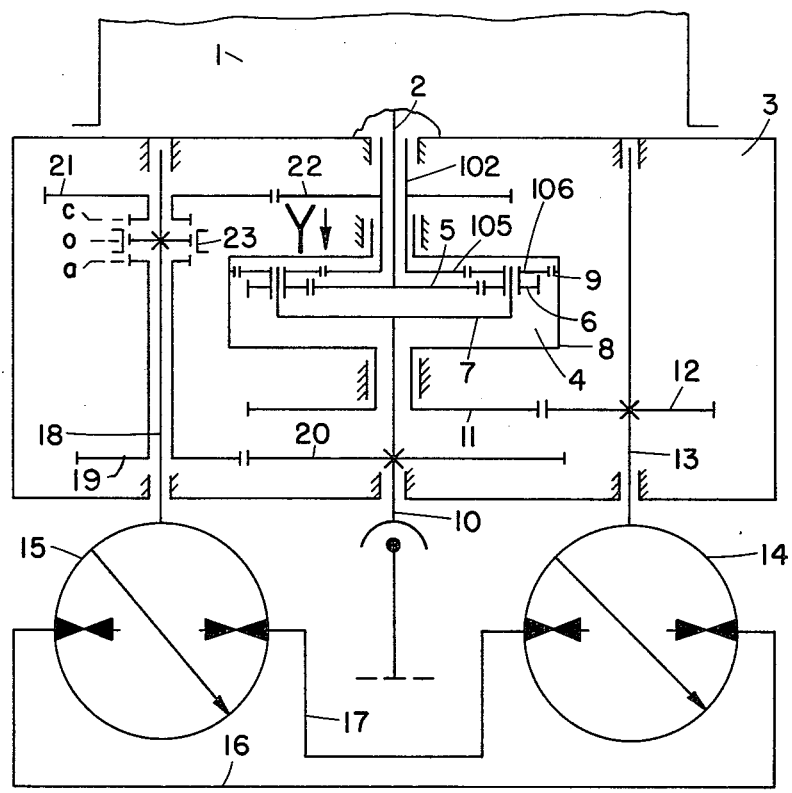
FIG. 1 is a schematic representation of a multiple-power gear drive or transmission pursuant to the invention.

Connected to a multiple-power gear drive or transmission pursuant to FIG. 1, which in its entirety is designated with reference numeral 3, is a driving engine or prime mover 1 on the side of a gear drive input shaft 2. The gear drive output shaft of the multiple-power gear drive is designated by reference numeral 10. Located intermediate the gear drive input shaft 2 and the gear drive output shaft 10 is a planetary differential gear drive 4 with a larger sun gear 5 and a smaller sun gear 105, dual planetary gears 6, 106, a web gear 7, as well as an internal gear 9 and a gearbox housing 8, said web gear being rigidly connected with said output shaft 10. The smaller sun gear 105 is rigidly connected with a hollow shaft 102 on which, in turn, a gear 22 is fixedly arranged. The larger sun gear 5 is rigidly connected with the gear drive input shaft 2. Fixedly connected with the housing 8 is a gear 11 which meshes with a gear 12 fixedly seated on a shaft 13. The shaft 13 provides the mechanical interconnection between the planetary differential gear drive 4 and a control power machine 14 which is constructed as a positive-displacement machine. The control power machine 14 can be driven in two directions as either a pump or motor and is connected through the intermediary of hydraulic conduits 16, 17 with a further positive-displacement machine which can be driven in two directions as either a pump or motor, and which is hereinafter referred to as a torque power machine 15.

The gear 22 which is seated on the hollow shaft 102 meshes with a gear 21 which is rotatably supported on a shaft 18. The shaft 18 provides the mechanical interconnection between the torque power machine 15 and the planetary differential gear drive 4. Furthermore, a gear 19 is rotatably supported on the shaft 18, and stands in engagement with a further gear 20 which is rigidly connected with the gear drive output shaft 10. Through the aid of a shift coupling 23, the gear 19 can be rigidly coupled with shaft 18 (shift position a), or the gear 21 rigidly coupled with the shaft 18 (shift position c). Arranged intermediate these two shift positions is a zero or neutral position of the shift coupling 23.

The rotational speed of the gear drive output shaft 10 is summed from the rotational speeds of the sun gear 5 and the internal gear 9 which determine the peripheral speed of the planetary gears 6 and, respectively, the web gear 7. The control power machine 14, through its rotational speed and direction of rotation, effects by means of the gear wheels 12 and 11 and the gearbox housing 8, the rotational speed and direction of rotation of the internal gear 9.

Should the gear drive output shaft 10 and an operating machine which is connected thereto be accelerated within a first operating range ($n_{output}$: $n_{input} < =0.5$), then the control power machine 14, during one direction of rotation of the internal gear 9, operates as a generator (pump) reversely to the direction of rotation of the sun gear 5 and delivers the converted power to the torque power machine 15. The torque power machine 15 operates as a motor and drives the shaft 18 wherein the shift coupling 23 is located in shift position a. In this manner the power is transmitted to the gear drive output shaft 10.

In a second operating range ($n_{output}$: $n_{input} > =0.5$), at the same direction of rotation of the internal gear 9 and the sun gear 5, the power control machine 14 operates as a motor which obtains its power through the conduits 16, 17 from the torque power machine 15 which, in this range, operates as a generator. The shift coupling 23 contrastingly is located in the shift position c. The driving power for the torque power machine 15 is thus taken off from the hollow shaft 102.

Figure 2:
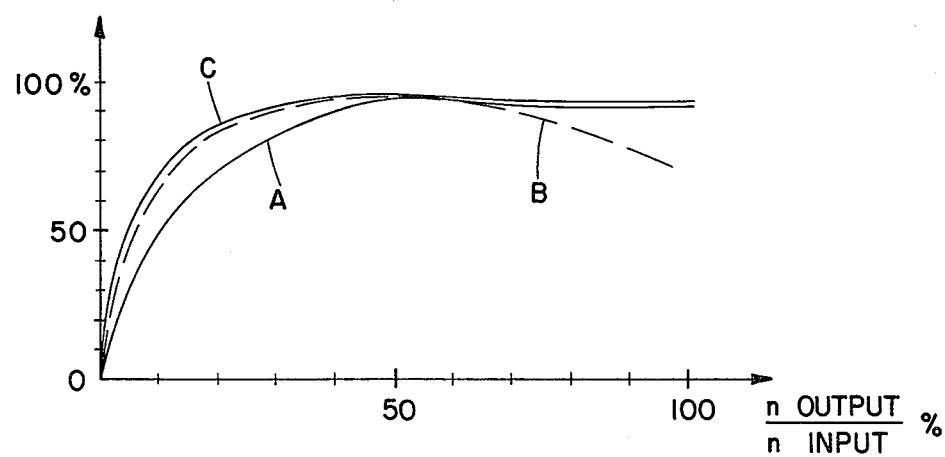
FIG. 2 is a degree of efficiency curve of such a multiple-power gear drive over the entire rotational speed range, compared with the corresponding degree of efficiency curves of known gear drives.

When the control power machine 14 is stationary, then the entire power which is transmitted from the multiple-power gear drive is transmitted practically entirely mechanically. In this situation, the switching over of the shift coupling 23 from the position a to c is effected at an increasing output rotational speed, or from position c to a at a reducing output rotational speed. This will avoid any negative, respectively, idle power, which is recognized as the main disadvantage of presently known multiple-power gear drives. From the efficiency diagram or curve, as shown in FIG. 2, there is ascertained the advantage of this solution, in effect, the connection of the torque power machine 15 to the hollow shaft 102 in the upper rotational speed range and the connection of the torque power engine to the gear drive output shaft 10 in the lower rotational speed range. The efficiency curve of the inventive arrangement is illustrated by the heavy-drawn curve C in this graph. The thin-drawn curve A in this graph characterizes a multiple-power gear drive constructed in accordance with the state of the art with the connection of the torque power machine 15 to only the input shaft 2 over the entire operating range, whereas the chain-dotted curve B characterizes a multiple-power gear drive in which the torque power machine 15 is connected with the gear drive output shaft 10 over the entire operating range.

Figure 4:
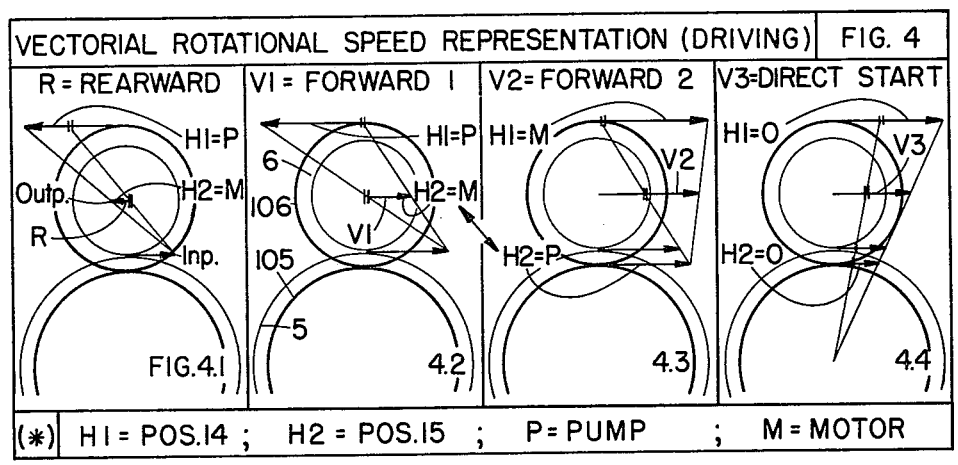
FIG. 4 is a vectorial rotational speed diagram of a planetary differential gear drive which is a component of the multiple-power gear drive according to FIG. 1.

The vector diagrams which are represented in FIG. 4 as FIGS. 4.1, 4.2, 4.3 and 4.4 serve for the elucidation of the function of the planetary differential gear drive under different operating conditions. Of the planetary differential gear drive 4 pursuant to FIG. 1 there is presently illustrated in FIG. 4 the sun gears 5, 105 and the planetary gears 6 and 106 and, namely, as viewed in the direction Y according to FIG. 1. The control power machine 14 is provided in the diagrams with the designation $H_1$, the torque power machine 15 with the designation $H_2$. The abbreviation P stands for pump, the abbreviation M for motor, so that the shortened designation specifies, for example, $H_1=P$, in essence, that in this operating condition the control power machine 14 works as a pump. The operating condition according to FIG. 4.1 illustrates the rearward or reverse position.

Figure 3:
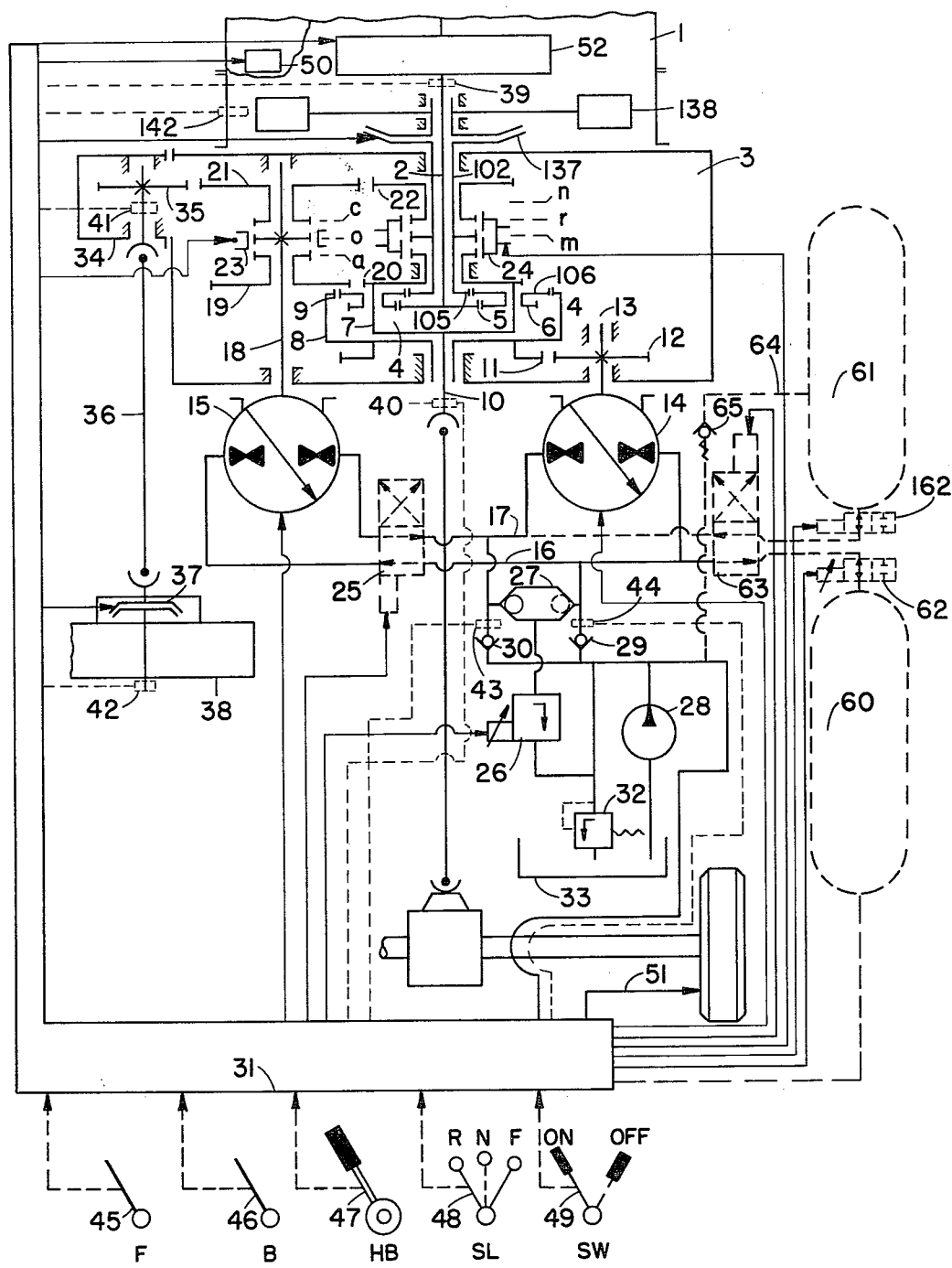
FIG. 3 is a schematic representation of a drive assembly for a vehicle incorporating a multiple-power gear drive or transmission pursuant to FIG. 1.

4.2 illustrates the forward position within a first operating range, 4.3 the forward position within a second operating range, and 4.4 a direct start according to the position of 4.3, however under consideration of an additionally provided shift coupling 24 as arranged, pursuant to FIG. 3, ahead of the planetary differential gear drive 3 so that in this shift position the coupling 24 is located in the position m.

The drive assembly which is schematically illustrated in FIG. 3 includes, as its nucleus, a multiple-power gear drive in accordance with FIG. 1 whereby, as has heretofore been indicated, a shift coupling 24 or clutch is connected ahead of the planetary differential gear drive 4. In a first shift position m, with the aid of the shift coupling 24 the gear 22 and the web gear 7 are interconnected with the gear drive input shaft 2. In a second position r, only the gear 22 is coupled to the hollow shaft 102, and in a position n, a torsionally resistant connection is no longer present between the hollow shaft 102 and the gear 22.

An idle running gear 52 is provided intermediate the motor 1 and the multiple-power gear drive 3 which allows for a higher rotational speed of the gear drive input shaft 2 than the rotational speed of the motor 1. A fuel metering arrangement for the motor 1 is designated with reference numeral 50.

A flywheel 38 is connected through the intermediary of a shiftable coupling 37 and a connecting shaft 36 with an auxiliary power take-off 34 of the multiple-power gear drive 3, in which the auxiliary power take-off 34 is coupled through a gear 35 with the gear 21 on the shaft 18.

In lieu of the flywheel 38, or in addition to this flywheel 38, there can also be provided a flywheel 138, as illustrated in FIG. 3. The flywheel 138 is rigidly connected with the hollow shaft 102 by means of a coupling 137.

In order to assure a minimum operating pressure in the closed circuit of the conduits 16, 17 and in the power machines 14, 15 a pump 28 is provided which is connected with the connecting conduits 16, 17 through non-return valves 29, 30. The pump 28, on occasion, also delivers the necessary pressurized control oil for a central regulator 31 which controls the function of the drive assembly. Connected to this central regulator 31 through operative connections are a gas pedal 45, a brake pedal 46, a handbrake 47, a selector lever 48 for the setting of "forward", "rearwards (reverse)" and "neutral", and an on-off switch 49. Furthermore, operative connections extend from different sensors of the drive assembly to the central regulator 31 and namely:

Connections from one rotational speed sensor 39 for the rotational speed of the drive input shaft 2;

a rotational speed sensor 40 for the rotational speed of the gear drive output shaft 10;

a rotational speed sensor 41 for the rotational speed of the gear 35;

a rotational speed sensor 42 or 142 for the rotational speed of the flywheel 38, respectively 138; and pressure sensors 43 and 44 for the pressure in the connecting conduits 16 and 17.

From the regulator 31, through suitable control conduits there are actuated the couplings 23, 24 and 37; the position of the wobble plates of the positive-displacement machines 14, 15; the fuel metering arrangement 50 for the motor 1; as well as a brake 51 for the drive wheels of the driven vehicle. Finally, also actuated are a pressure control valve 26 and a control valve 25.

The control valve 25 is so connected as to concurrently switch over the connecting conduits between the power machines 14 and 15 with the mechanical switching of the shift coupling 23. Such a control valve is, above all, only required when the power machines 14, 15 relate to positive-displacement machines with variable displacement volumes in which a wobble plate is displaceable in only one direction. Consequently, since in such positive-displacement machines the rotational and momentum direction cannot be achieved through a plus-minus oscillation, there follows a reversal in the suction and pressure connections. The control pressure valve 26 which is connected through a self-actuating switching arrangement 27 with the pressurized connecting conduit of the control power machine 14, controls the momentum of this control power machine, since the torque power machine 15 does not afford any control capability due to the zero or neutral position of its wobble plate. A prerequisite for this control function is that the control power machine 14 still operates as a pump at the instance of the switching over of the shift coupling 23, in essence, is theoretically displaced in contrast with the actual shifting of the shift coupling 23, or that another source such as, for example, an additional pump (not shown) or a hydro-accumulator, affords the required excess pressure. This can also be effectuated through the control pump 28 when there is present an additional switchable connection to the pressure side of the control power machine 14. A further function of the control pressure valve 26 is the continuous braking of the vehicle when the two power machines 14 and 15 operate as generators, respectively, pumps.

Provided for the limitation of the control pressure is an additional pressure relief valve 32. The control pressure valve 26 is connected to the pressure side of the pump 28; the pressure relief valve 32 and the pump 28 are also connected to a common oil sump 33. The pump 28 is preferably driven by the gear drive input shaft 2 or by the hollow shaft 102.

As additional energy accumulators there can also be provided a high-pressure accumulator 60 and a low-pressure accumulator 61 in the drive assembly of FIG. 3. The function of the drive assembly with or without such hydro-accumulators 60 and 61 leading to the connecting conduits 16, 17 between power machines 14, 15 is effected by means of controllable check valves 62 and 162 and a pilot valve 63, which are controlled by the central regulator 31. The check valves 62 and 162 serve to prevent losses of oil pressure energy at the standstill of a power machine and, in addition thereto, control the actuation and deactivation of the hydro-accumulators. The pilot valve 63 connects the low-pressure accumulator 61 with the suction side of the control power machine 14 and the high-pressure accumulator 60 with the pressure side of the control power machine 14, in which the suction and pressure sides of this control power machine 14 differ in accordance with the operating situation (driving or braking). A connecting conduit 64 with a non-return valve 65 therein leads from the low-pressure accumulator 61 to the pressure relief valve 32 so as to prevent impermissible excess pressures.

When the drive assembly is to be operated without the hydro-accumulators 60, 61, in effect, with only the flywheel 38 as the energy accumulator, there is then obtained a function as described, for instance, in connection with the drive installation in the previous German patent application No. P 26 41 866.0. The differences with respect to the functions described therein are essentially as follows:

The charging of the flywheel 38 during the standstill of the vehicle is carried out hydrostatically. At an actuated handbrake of the vehicle and a shift position n for the coupling 24, the control power machine 14 is driven by the motor 1. The power is transmitted from the torque power machine 15 to the flywheel 38 through the gears 21 and 35 at a closed coupling 37 or, in an arrangement with a flywheel 138, through the gear wheels 21 and 22 with a closed coupling 137 to the flywheel 138.

A further difference of the present drive assembly with respect to the installation as shown in German patent application No. P 26 41 886.0 consists of in that, during constant driving of the vehicle, within this operating range in the present drive assembly the motor 1 is mechanically connected directly with the gear drive output shaft, and namely through the shift position m of the coupling 24. This shifting is effected at synchronized rotational speed and without interruption of the flow of power. As a result, the small sun gear 105 is coupled together with the web gear 7, and the planetary differential gear drive 4 becomes a rotationally fixed connection between the gear drive input shaft 2 and the gear drive output shaft 10.

It is also possible to effect an operation of the drive component group exclusively with hydro-accumulators and in the absence of flywheel 38 or 138. The flywheel 38, besides the drive 34 and the therewith associated components can in this instance be eliminated. The acceleration of the vehicle with hydro-accumulators is carried out in a manner wherein the torque power engine 15 from commencement is connected with the gear drive input shaft 2 in conformance with the shift position c of the coupling 23, and wherein the coupling 24 is located in position m so that the gear drive input shaft 2 and the gear drive output shaft 10 are rigidly coupled together. The two power machines 14 and 15 are then effective as motors during the acceleration of the vehicle. At the end of the acceleration phase, the check valves 62 and 162 are closed and there follows a normal operating mode of the gear drive.

The present drive assembly can also be operated with a flywheel and a so-called surge of buffer accumulator whereby an installation is provided which is similar to that described in German Laid-Open patent application No. 25 15 048. The high-pressure accumulator 60 assumes pressurized oil in a first phase and leads this pressurized oil to a positive-displacement machine in a second phase. In this type of operation of the present drive assembly, the torque power machine 15 is in a zero or neutral position, in essence, the set angular position of the wobble plate of this power engine 15 is zero.

Figure 5:
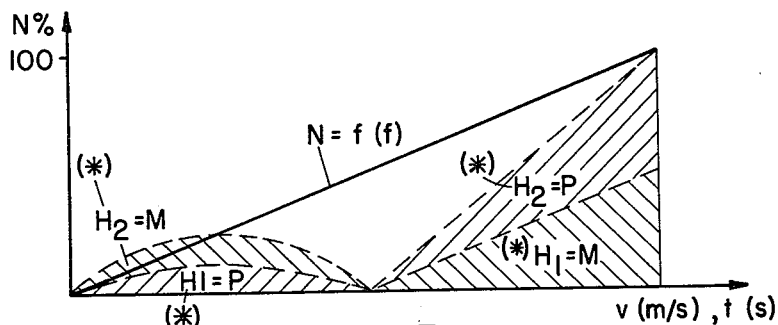
FIG. 5 is a diagrammatic representation of the power transmission in a drive assembly of a vehicle without the use of hydro-accumulators during the acceleration of the vehicle.
Figure 6:
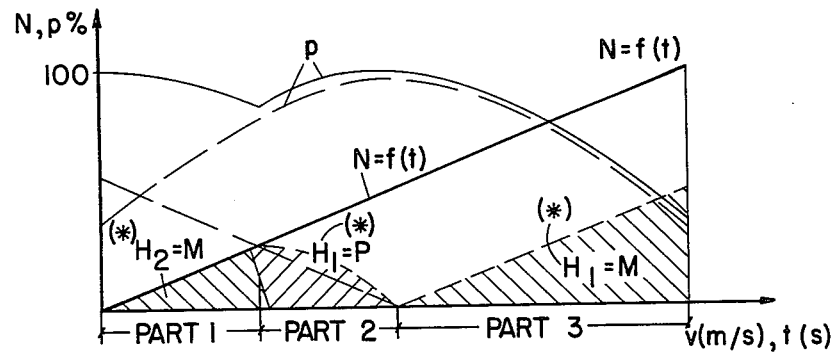
FIG. 6 is a diagrammatic representation of the power transmission in a drive assembly of a vehicle with the use of hydro-accumulators during the acceleration of the vehicle.

When the drive assembly pursuant to FIG. 3 is operated in a manner whereby the flywheel 38 as well as the hydro-accumulators 60, 61 are employed as energy accumulators, in effect, at the end of a braking phase of the vehicle the high-pressure accumulator 60 has a higher energy content than at the initiation of the braking phase, there are then obtained advantages in contrast with the operation with the flywheel 38, respectively 138, as energy accumulators and the low-pressure accumulator 61 as buffer accumulator, which are illustrated through a comparison between FIGS. 5 and 6 of the drawings. Illustrated in FIG. 5 is an acceleration sequence of the vehicle without high-pressure accumulator. The sloped hatched areas signify the energies hydrostatically converted by the respective power engines 14, 15 which can be ascertained in comparison with the actually transmitted driving energy (that is the area below the function line $N=f(t)$). In the use of a high-pressure accumulator 60 there is carried out the conversion of the hydrostatic power in accordance with speed. Thereby, the entire hydrostatically converted energy drops off considerably and corresponds to the sloped hatched area in FIG. 6. The thin chain-dotted line curve which is constituted of the dashes pursuant to FIG. 6 illustrates, contrastingly, that the hydrostatically converted energy in a system which operates with only a flywheel and buffer accumulator (according to German Laid-Open patent application No. 25 15 048) lies higher than the hydrostatically converted power obtained through the utilization of a flywheel and a high-pressure accumulator. In order to attain these advantageous values, the following function is contemplated for the inventive drive assembly.

A first portion of the acceleration of the vehicle is effected only through the torque power machine 15 and, namely, purely hydrostatically. The pressure p drops off in the high-pressure accumulator 60. During a short transitional phase the power is transmitted through the control power machine 14, which signifies an initiation in the operation of the flywheel drive. In a second portion of the vehicle acceleration in which the torque power machine 15 is operated as a pump, the pressure in the high-pressure accumulator 60 is again brought to the original pressure level. Finally, in a third portion of the acceleration and, in essence, after the shifting of the coupling 23, the control power machine 14 operates as a motor up to the end of the acceleration phase and utilizes energy from the high-pressure accumulator 60. Thereby, the pressure in the high-pressure accumulator 60 drops down to a minimal level. As the end of the acceleration, the driving is continued through a normal operation of the gear drive. During the braking phase of the vehicle, the sequences operate in a mirror-image manner relative to the acceleration phase.

Figure 7:
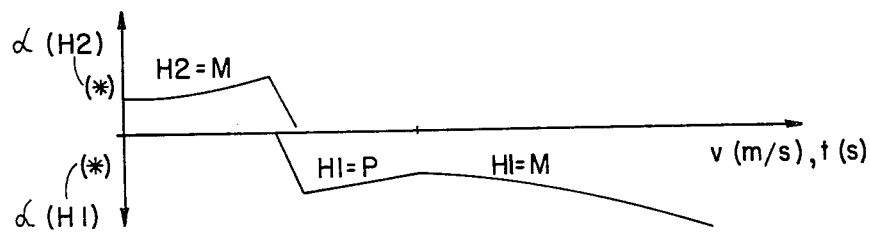
FIG. 7 is the wobble plate angle of the control power and torque power engines of the multiple-power gear drive of the drive assembly, which are constructed as positive-displacement machines, during an acceleration of the vehicle.

Illustrated in FIG. 7 is the change in the wobble plate angle $\alpha$ of the power machines 14, 15 during the above-described acceleration sequence.

Finally, note is to be taken that, in lieu of the hydraulic power machines 14, 15 and the hydro-accumulators 60, 61, there can in the same manner be employed electrical power or energy machines and electrical accumulators, and in lieu of the shifting clutch couplings 23 and 24, otherwise constructed or arranged disc clutch couplings without any change in the manner of functioning of the entire drive assembly.

What is claimed is:

1. In a multiple-power gear drive transmission comprising a planetary differential gear drive including at least first, second and third drive elements; a gear drive input shaft connected with at least one of said drive elements; a gear drive output shaft connected with another of said drive elements; a first positive-displacement machine operable in both directions being coupled to a third of said drive elements for controlling the direction of rotation and speed of rotation thereof; and a second positive-displacement machine being energy-transmissively coupled with said first positive-displacement machine; the improvement comprising said planetary differential gear drive includes two sun gears having different diameters; a web gear being arranged on dual planetary gears, said dual planetary gears meshing with said sun gears and with an internal gear wherein said larger sun gear is connected with said gear drive input shaft; and shift couplings for selectively connecting said second positive-displacement machine in dependence upon the speed of rotation of said gear drive output shaft with either said gear drive output shaft or with the smaller sun gear.

2. Gear drive as claimed in claim 1, said first positive-displacement machine being a control power machine and said second positive-displacement machine being a torque power engine.

3. Gear drive as claimed in claim 1, said first positive-displacement machine being connected with said internal gear and said web gear being connected with said gear drive output shaft.

4. Gear drive as claimed in claim 2, comprising a gear assembly for coupling said torque power engine to the gear drive input shaft, a first gear pair including a first gear fastened on a hollow shaft coupled with said smaller sun gear and a second gear fixedly connected with said torque power engine, a second gear pair adapted to form a coupling to said drive outlet shaft including a first gear seated on said gear drive output shaft and a second gear rigidly connectable with said torque power engine, the ratio of said two pairs of gears being so selected that, when the control power machine stands still the relationship $$Z_{22}/Z_{21} \cdot n_{input} = Z_{20}/Z_{19} \cdot n_{output}$$

is effective, wherein $Z_x$ = the number of teeth of gear x;
$n_{input}$ = the rotational speed of the hollow shaft;
$n_{output}$ = the rotational speed of the gear drive output shaft.

5. Gear drive as claimed in claim 4, wherein the second gear of said first gear pair is adapted to be uncoupled from the shaft of said torque power engine.

6. Gear drive as claimed in claim 2 or claim 3 or claim 4, wherein in a lower speed range of said gear drive output shaft, said torque power engine is connected with said gear output shaft through one of said shift couplings.

7. Gear drive as claimed in claim 1, wherein at least two drive elements of said planetary differential gear drive are movable relative to each other in a differential operation; and a further shift coupling for fixedly connecting said drive elements to each other.

8. Gear drive as claimed in claim 2 or claim 3, or claim 4, comprising a pressure control valve, said energy-transmissive connections between the control power machine and the torque power engine being connected to said pressure control valve, said valve assuming control over the operative pressure of the control power machine during actuation of the shift coupling and correspondingly determines the output momentum of said gear drive.

9. Gear drive as claimed in claim 8, wherein switching means are connected with said energy-transmissive connecting conduits for connecting the currently pressurized conduit with the control pressure valve in a self-actuating mode.

10. Gear drive as claimed in claim 2, comprising a control valve arranged in the energy-transmissive connections intermediate the power machines so as to concurrently effect the switching over of the connections with the actuation of the shift coupling.

11. Drive assembly for intermittently-operating work machines, particularly for vehicles, including at least one driving engine; brake energy accumulator means and a multiple-power gear drive for connecting an output shaft of said drive assembly with the brake energy accumulator means and the driving engine characterized in that it incorporates a multiple-power gear drive as claimed in claim 1 or 2 or 3.

12. Drive assembly as claimed in claim 11, wherein said brake energy accumulator means includes a flywheel which is connectable with said smaller sun gear.

13. Drive assembly as claimed in claim 11, wherein said brake energy accumulator means includes a flywheel and a hydro-accumulator, a high-pressure accumulator being connectable to at least one power machine so as to supply said machine with driving energy during an accelerating phase of the vehicle.

14. Drive assembly as claimed in claim 13, comprising a pilot valve for connecting a low-pressure accumulator with the suction side of the control power machine and the high-pressure accumulator with the high-pressure side of the control power machine.

15. Drive assembly as claimed in claim 13, comprising a controllable check valve in the connection between the high-pressure accumulator and at least one of said power machines for controlling the pressure transition during the actuation or deactivation of the drive with hydro-accumulators.

16. Drive assembly as claimed in claim 13, comprising automatic control means for the operation of the drive assembly, said control means driving an acceleration phase of the vehicle and subsequent to mechanical actuation of the shift coupling for the higher rotational speed range switching the control power machine into a motor and connecting the latter with said high-pressure accumulator.

17. Drive assembly as claimed in claim 16, said control means simultaneously converting energy of only one of said power machines.

18. Drive assembly as claimed in claim 16, said control means controlling the pressure in the high-pressure accumulator to be higher at the commencement of the acceleration phase of the vehicle than at the end of said phase.

19. Gear drive as claimed in claim 1, said first and second positive-displacement machines each comprising an electromachine operable in a four-quadrant operation.

* * * * *

UNITED STATES PATENT AND TRADEMARK OFFICE
CERTIFICATE OF CORRECTION

PATENT NO. : 4,313,351

DATED : February 2, 1982

INVENTOR(S) : Faust Hagin

It is certified that error appears in the above-identified patent and that said Letters Patent are hereby corrected as shown below:

Column 1, line 44: "$>0.5$" should be -- $<0.5$ --.

Signed and Sealed this

Second Day of November 1982

[SEAL]

Attest:

GERALD J. MOSSINGHOFF

Attesting Officer

Commissioner of Patents and Trademarks